United States Patent
Wang et al.

(10) Patent No.: US 11,095,836 B2
(45) Date of Patent: Aug. 17, 2021

(54) IMAGE SENSOR FAR END DRIVER CIRCUITRY PROVIDING FAST SETTLING ROW CONTROL SIGNALS

(71) Applicant: OMNIVISION TECHNOLOGIES, INC., Santa Clara, CA (US)

(72) Inventors: Rui Wang, San Jose, CA (US); Hiroaki Ebihara, San Jose, CA (US); Zhiyong Zhan, Fremont, CA (US); Liang Zuo, San Mateo, CA (US); Min Qu, Mountain View, CA (US); Wanqing Xin, San Jose, CA (US); Xuelian Liu, Sunnyvale, CA (US)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 0 days.

(21) Appl. No.: 16/685,663

(22) Filed: Nov. 15, 2019

(65) Prior Publication Data
US 2021/0152756 A1    May 20, 2021

(51) Int. Cl.
*H04N 5/341* (2011.01)
*H04N 5/378* (2011.01)
*H04N 5/351* (2011.01)
*H04N 5/357* (2011.01)

(52) U.S. Cl.
CPC ............. *H04N 5/341* (2013.01); *H04N 5/351* (2013.01); *H04N 5/378* (2013.01); *H04N 5/357* (2013.01)

(58) Field of Classification Search
CPC ......... H04N 5/341; H04N 5/378; H04N 5/357
See application file for complete search history.

(56) References Cited

U.S. PATENT DOCUMENTS

2006/0001918 A1*  1/2006  Okano ................. H04N 5/3653
                                                          358/482
2019/0230294 A1*  7/2019  Singh ................... H04N 5/3559

* cited by examiner

*Primary Examiner* — Christopher K Peterson
(74) *Attorney, Agent, or Firm* — Christensen O'Connor Johnson Kindness PLLC

(57) ABSTRACT

An image sensor includes a pixel array with rows and columns of pixels. Each row of the pixel array has a first end that is opposite a second end of each row of the pixel array. Control circuitry is coupled to the first end of each row of the pixel array to provide control signals to each row of the pixel array from the first end of each row of the pixel array. Far end driver circuitry coupled to the second end of each row of the pixel array to selectively further drive from the second end of each row of the pixel array the control signals provided by the control circuitry from the first end of each row of the pixel array. The control circuitry is further coupled to provide far end control signals to the far end driver circuitry.

17 Claims, 8 Drawing Sheets

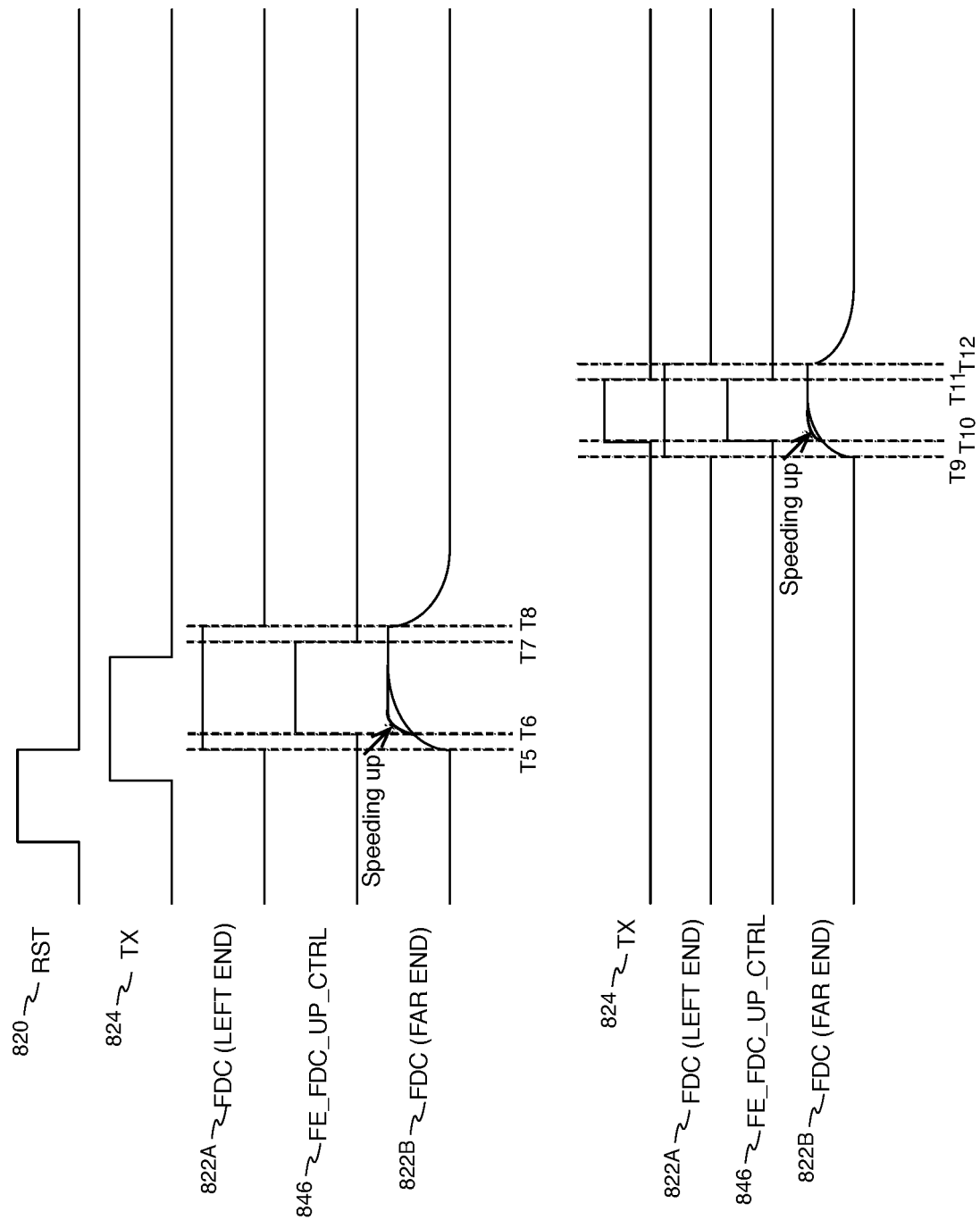

IMAGE SENSOR FAR END DRIVER CIRCUITRY PROVIDING FAST SETTLING ROW CONTROL SIGNALS

BACKGROUND INFORMATION

Field of the Disclosure

This disclosure relates generally to image sensors, and in particular but not exclusively, relates to control circuitry that generates row control signals for an image sensor.

Background

Image sensors have become ubiquitous. They are widely used in digital still cameras, cellular phones, security cameras, as well as medical, automobile, and other applications. The technology used to manufacture image sensors has continued to advance at a great pace. For example, the demands of higher resolution and lower power consumption have encouraged the further miniaturization and integration of these devices.

In large format image sensors (e.g., a 48 megapixel image sensor), the row control or horizontal driving signals typically propagate relatively long distances as they are routed across an entire row of the image sensor. As a consequence, the row control signals may suffer from increasingly long resistor-capacitor (RC) delays as image sensor sizes increase. For instance, assuming that the control circuitry that generates the row control signals is coupled to the left side of the pixel array, the driving strength of the row control signals as they propagate across from the left side of the pixel array to the right side of the pixel array results in an unbalanced output (e.g., shading), which is caused by the RC delays on the row control signals.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 8 illustrates another example timing diagram that shows examples of control signals and far end control signals found in another example of far end driver circuitry in accordance with the teachings of the present invention.

Figure 1:
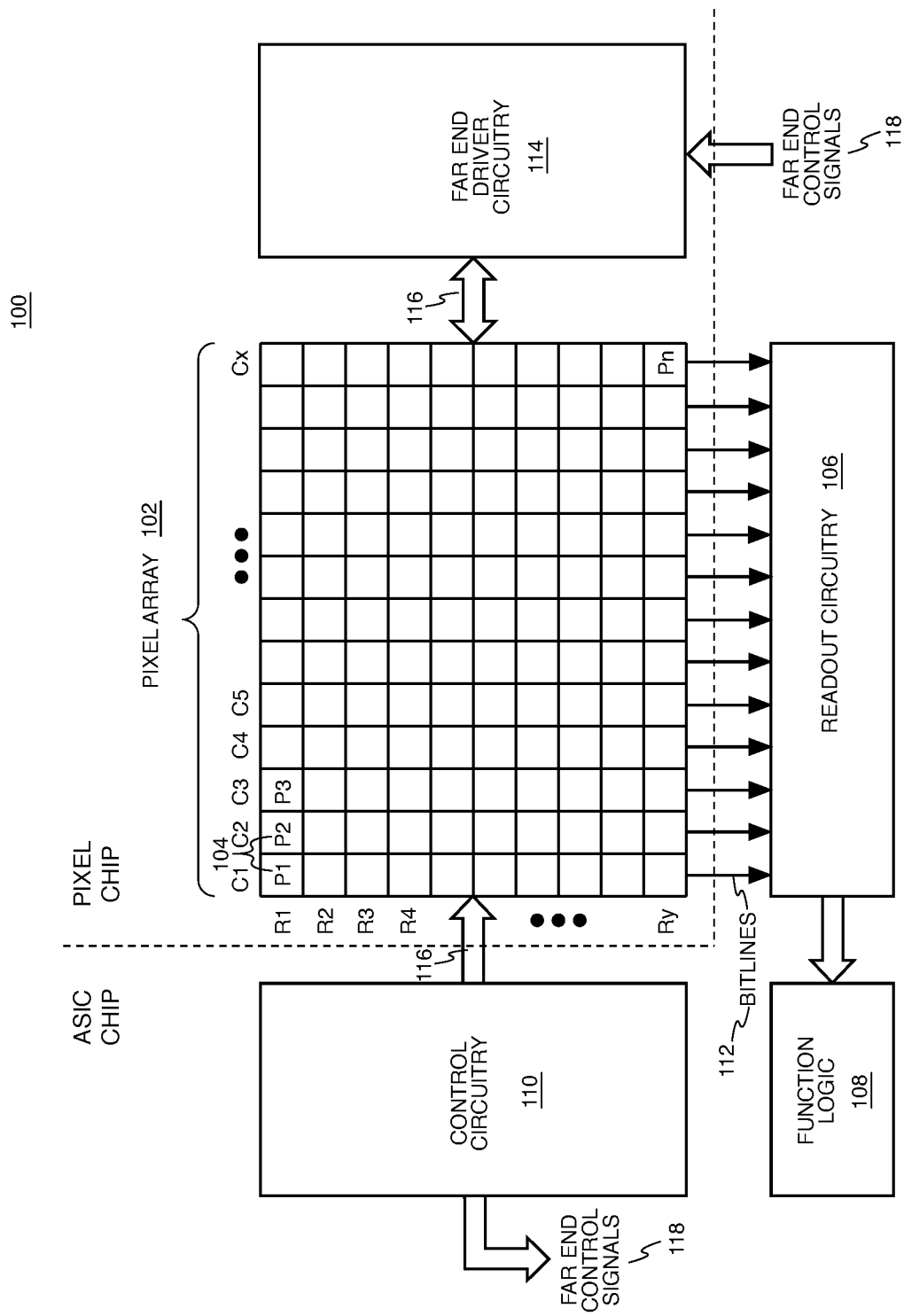
FIG. 1 illustrates one example of an imaging system including example far end driver circuitry in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Examples directed to far end driver circuitry to provide fast settling times for row control signals for an image sensor are described herein. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

It is preferred to have fast settling times for row control signals in image sensors. However, the parasitic RC values are high in advanced technologies, such as image sensors with feature sizes that are 40 nm and below. As will be discussed, examples in accordance with the teachings of the present invention include an image sensor having a pixel array including rows and columns. In the various examples, control circuitry is coupled to one end of each row of the pixel array to provide row control signals. In addition, far end driver circuitry is coupled to the opposite end of each row of the pixel array to further drive the row control signals provided by the control circuitry and reduce the settling times of the row control signals in accordance with the teachings of the present invention. With the reduced settling times, the driving strength of the row control signals is more balanced between the opposite sides of the pixel array, which enables the pixel array to provide more balanced images with reduced shading in accordance with the teachings of the present invention.

To illustrate, FIG. 1 shows a block diagram illustrating an example imaging system 100 that includes far end driver circuitry in accordance with the teachings of the present invention. Imaging system 100 may be implemented as complementary metal-oxide-semiconductor ("CMOS") image sensor. As shown in the example illustrated in FIG. 1, imaging system 100 includes pixel array 102 that is coupled to control circuitry 110 on one side (e.g., "left" side) to receive control signals 116. Pixel array 102 is also coupled to readout circuitry 106, which is coupled to function logic 108. In the depicted example, far end driver circuitry is coupled to the pixel array 102 on the opposite side from the control circuitry 110 (e.g., on the "right" side) to further drive the control signals 116 that have propagated through the pixel array 102. In the example, the far end driver circuitry 114 is coupled to receive far end control signals 118 that are generated by the control circuity 110.

In one example, the pixel array 102 and far end driver circuitry 114 may be included in a pixel chip of the imaging system 100, and the control circuitry, readout circuitry 106, and function logic 108 may be included in an application specific integrated circuit (ASIC) chip of the imaging system 100.

In the examples described in this disclosure, it is noted that the control circuitry 110 is illustrated as being coupled to the "left" side pixel array 102 and that the far end driver circuitry 114 is illustrated as being coupled to the "right" side of pixel array 102 for explanation purposes. However, in other examples, it is appreciated that the control circuitry 110 and far end driver circuitry 114 may be coupled different sides of the pixel array 102, but that they are coupled to opposite sides of the pixel array 102 such that the control signals 116 driven from one side of the pixel array 102 by control circuitry 110, and are further driven from the opposite side of pixel array 102 by the far end driver circuitry 114.

The illustrated embodiment of pixel array 102 is a two-dimensional ("2D") array of imaging sensors or pixel cells 104 (e.g., pixel cells P1, P2, . . . , Pn). As illustrated in the depicted example, each pixel cell 104 is arranged into a row (e.g., rows R1 to Ry) and a column (e.g., columns C1 to Cx) to acquire image data of a person, place or object, etc., which can then be used to render an image of the person, place or object, etc.

In one example, after each pixel cell 104 has acquired its image charge or image data, the image data is read out by readout circuitry 106 through readout column bitlines 112 and then transferred to function logic 108. In various examples, readout circuitry 106 may include amplification circuitry (not illustrated), a column readout circuit that includes analog-to-digital conversion (ADC) circuitry, or otherwise. Function logic 108 may simply store the image data or even manipulate the image data by applying post image effects (e.g., crop, rotate, remove red eye, adjust brightness, adjust contrast, or otherwise). In one example, readout circuitry 106 may read out a row of image data at a time along readout column lines (illustrated) or may read out the image data using a variety of other techniques (not illustrated), such as a serial read out or a full parallel read out of all pixels simultaneously.

In one example, control circuitry 110 is coupled to drive control signals 116 to be received by pixel array 102 to control operational characteristics of pixel array 102. For instance, in one example control circuitry 110 generates control signals 116, which may include transfer gate signals, reset signals, row select signals, and other control signals to control the transfer and readout of image data from the photodiode or photodiodes of each pixel cell 104 of pixel array 102. In addition, in some examples, control circuitry 110 may generate a shutter signal for controlling image acquisition. In one example, the shutter signal is a global shutter signal for simultaneously enabling all pixels within pixel array 102 to simultaneously capture their respective image data during a single acquisition window. In another example, the shutter signal is a rolling shutter signal such that each row, column, or group of pixels is sequentially enabled during consecutive acquisition windows. The shutter signal may also establish an exposure time, which is the length of time that the shutter remains open. In one embodiment, the exposure time is set to be the same for each of the frames.

Figure 2A:
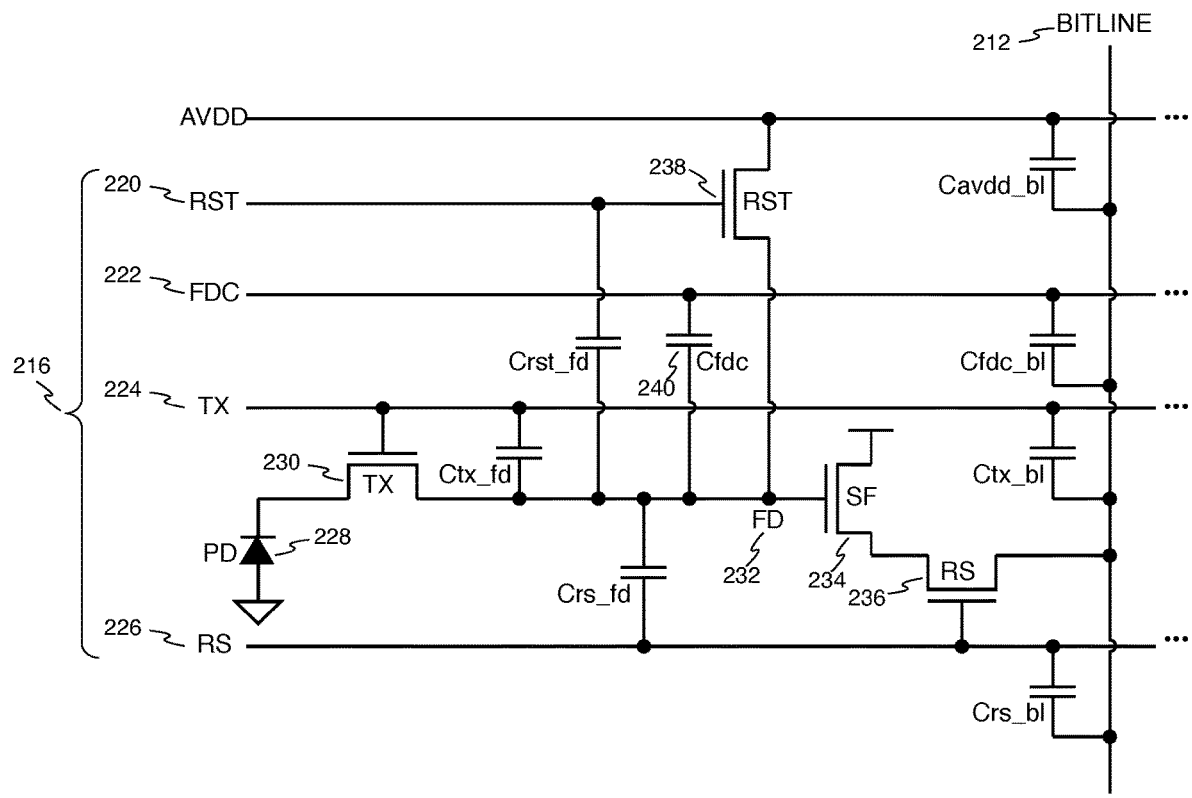
FIG. 2A illustrates an example pixel included in an example pixel array in accordance with the teachings of the present invention.

FIG. 2A illustrates an example of one of a plurality of pixel cells 204 included in an example pixel array in accordance with the teachings of the present invention. It is noted that the example pixel cell 204 illustrated in of FIG. 2A may be an example of one of the pixel cells 104 of FIG. 1, and that similarly named and numbered elements referenced below are coupled and function similar to as described above.

As shown in the depicted example, pixel cell 204 is coupled to be driven by row control signals 216 received from control circuitry (e.g., control circuitry 110). In the illustrated example, row control signals 216 include a reset control signal (RST) 220, a floating diffusion capacitor control signal (FDC) 222, a transfer control signal (TX) 224, and a row select control signal (RS) 226. A photodiode 228 is coupled to photogenerate image charge (e.g., electrons) in response to incident light. A transfer transistor 230 is coupled to the photodiode 228 to transfer the photogenerated image charge from the photodiode 228 to a floating diffusion capacitor (Cfdc) 240 coupled to a floating diffusion (FD) node 232 in response to the transfer control signal 224. A gate terminal of an amplifier transistor, such as for example a source follower (SF) transistor 234 is coupled to the floating diffusion capacitor Cfdc 240 to generate an image data signal in response to the photogenerated image charge stored in floating diffusion capacitor Cfdc 240. A row select transistor is coupled to the source follower transistor 234 to output the image data signal from the source follower transistor 234 to bitline 212 in response to the row select control signal 226. A reset transistor 238 is coupled between a power supply AVDD and the floating diffusion capacitor Cfdc 240 to reset the pixel cell 204 in response to the reset control signal 220. In addition, in the depicted example, the floating diffusion capacitor Cfdc 240 is coupled between the floating diffusion capacitor control signal 222 and the floating diffusion node 232.

The example depicted in FIG. 2A also illustrates example parasitic capacitances that may be coupled to the various row control signals 216 in each pixel cell 204. For instance, a parasitic capacitance Ctx_fd exists between the transfer control signal 224 and the floating diffusion node 232. A parasitic capacitance Crst_fd exists between the reset control signal 220 and the floating diffusion node 232. A parasitic capacitance Crs_fd exists between the row select control signal 226 and the floating diffusion node 232. A parasitic capacitance Cavdd_bl exists between the power supply AVDD and the bitline 212. A parasitic capacitance Cfdc_bl exists between the floating diffusion capacitor control signal 222 and the bitline 212. A parasitic capacitance Ctx_bl exists between the transfer control signal 224 and the bitline 212.

A parasitic capacitance Crs_bl exists between the row select control signal 226 and the bitline 212. The impact of all of the parasitic capacitance accumulate as the row control signals 216 propagate across the pixel array from one side to the opposite side, which accumulate or increase the RC delays that slow down the settling times for the row control signals 216 as they propagate across the pixel cells of the pixel array.

Figure 2B:
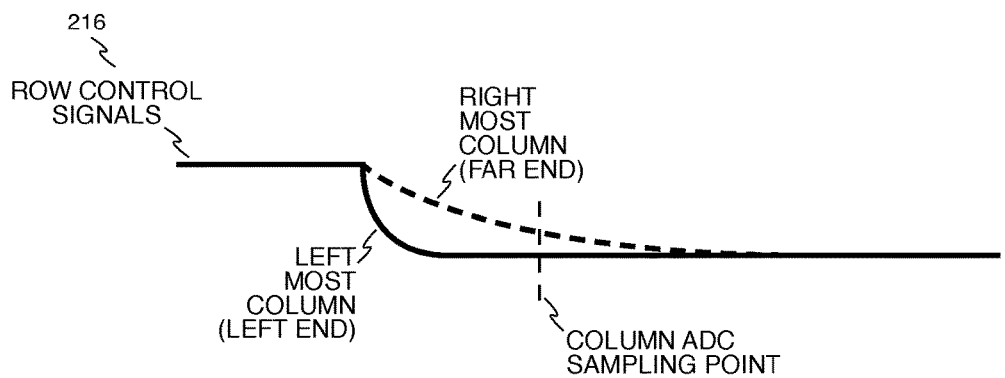
FIG. 2B illustrates an example timing diagram that shows example row control signals suffering from RC time delays from the left side of the pixel array to the right side of the pixel array, which cause slow settling times and unbalanced images.

To illustrate, FIG. 2B shows an example timing diagram that shows example row control signals suffering from RC time delays from one side (e.g., "left" side) of the pixel array to the opposite side (e.g., "right" side or far end) of the pixel array, which consequently result in slower settling times and an unbalanced image output. In the depicted illustration, row control signals 216 are initially at a high value, and then transition to a low value. As shown in the example, the row control signals 216 quickly settle from the high value to the low value for the left most column of the pixel array. However, the row control signals 216 on the right most column of the pixel array slowly settle from the high value to the low value, due to the RC time delay. Consequently, the point in time at which the column analog to digital converter (ADC) samples the signals is adversely affected by the RC time delay on the right most or far end column compared to the left most column of the pixel array, which results in an unbalanced image.

Figure 3:
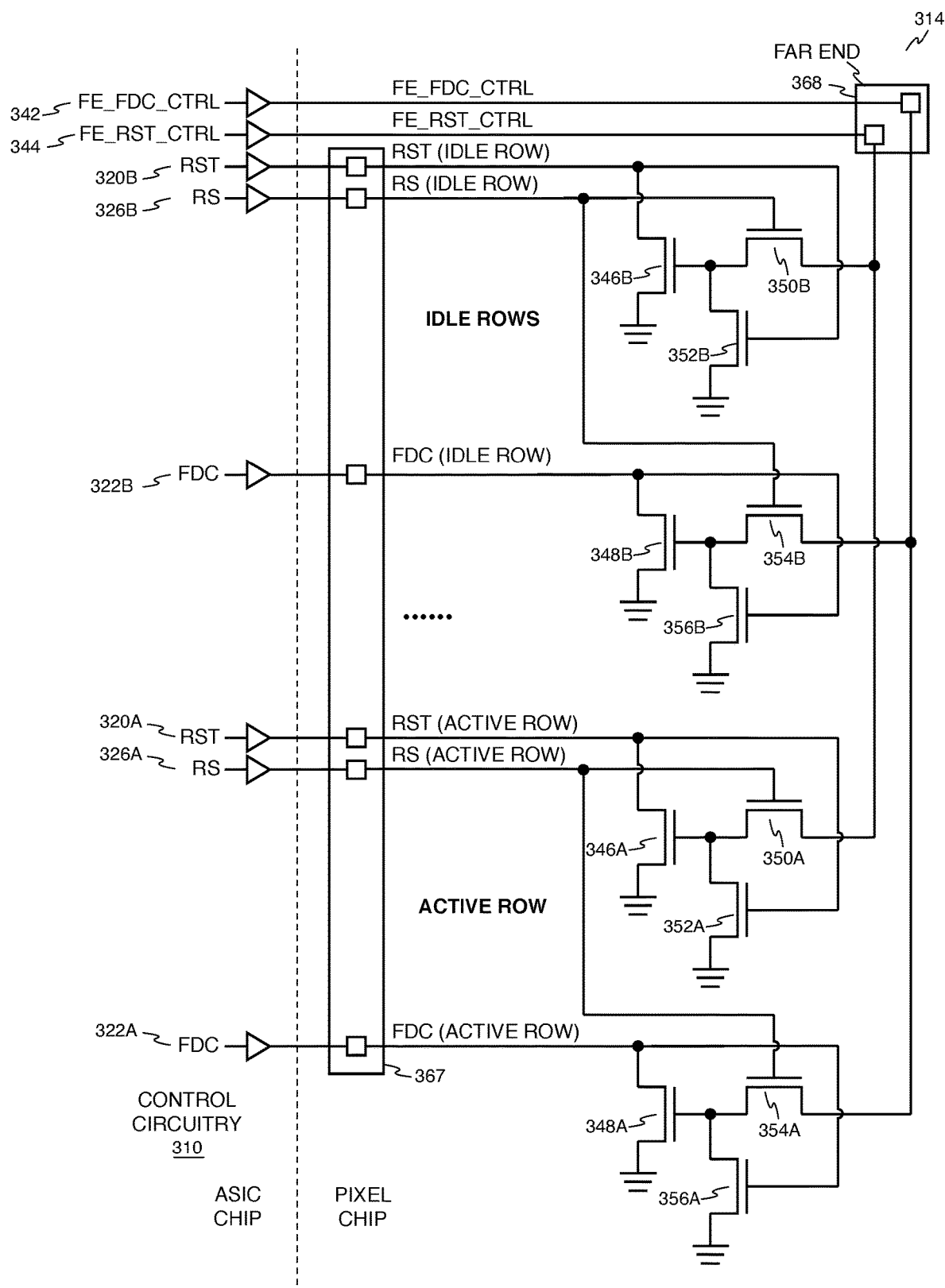
FIG. 3 illustrates an example schematic of far end driver circuitry in accordance with the teachings of the present invention.

FIG. 3 illustrates an example schematic of far end driver circuitry 314 in accordance with the teachings of the present invention. It is noted that the example far end driver circuitry 314 and the control signals illustrated in of FIG. 3 may be examples of the far end driver circuitry and control signals described above, and that similarly named and numbered elements referenced below are coupled and function similar to as described above. As will be shown in the example depicted in FIG. 3, the far end driver circuitry 314 is configured to decrease the settling time of the reset control signal RST 320A and the floating diffusion capacitor control signal FDC 322A by pulling down these signals of the active row during transitions from a high level to a low level. In the example, the row select control signal RS 326A is configured to indicate the active row.

In the example illustrated in FIG. 3, control circuitry 310 is disposed in an ASIC chip and is coupled to generate row control signals and far end control signals. The illustrated example shows row control signals including reset control signals RST 320, floating diffusion capacitor control signals FDC 322, and row select control signals RS 326, which are coupled to be received by hybrid bonds (HB) or through silicon vias (TSVs) on the "left" or near side 367 of the pixel chip closest to the control circuitry 310. The illustrated example also shows far end control signals including far end floating diffusion capacitor control signal (FE_FDC_CTRL) 342 and far end reset control signal (FE_RST_CTRL) 344, which are coupled to be received by hybrid bonds (HB) or through silicon vias (TSVs) on the "right" or far end 368 of the pixel chip opposite to the control circuitry 310.

In the depicted example, the reset control signal RST 320A, floating diffusion capacitor control signal FDC 322A, and row select control signal RS 326A are coupled to drive the pixel cells (e.g., pixel cells 104, 204) of the active row of the pixel array, while the reset control signal RST 320B, floating diffusion capacitor control signal FDC 322B, and row select control signal RS 326B are coupled to drive the pixel cells (e.g., pixel cells 104, 204) of the idle rows of the pixel array. As such, it is appreciated that in one example, the idle row control signal values are AVDD for reset control signal RST 320B, NVDD for row select control signal RS 326B, and AGND for floating diffusion capacitor control signal FDC 322B.

In the depicted example, the far end driver circuitry 314 includes 6 transistors coupled to the far end (e.g., next to the right most column) of each row of the pixel array. As such, it is appreciated that the illustrated transistors of far end driver circuitry 314 are coupled to receive the control signals after they have propagated across all of the pixels (e.g., 104, 204) of each row of the pixel array. In the illustrated example, the 6 transistors for each row are NMOS transistors. In other examples, it is appreciated that the polarities of the 6 transistors and control signals may be reversed depending on the logic of the system. In the example shown in FIG. 3, the far end driver circuitry 314 that is coupled to the active row includes a transistor 346A having a first end coupled to receive the reset control signal RST 320A and a second end coupled to a reference terminal, such as GND. Far end driver circuitry 314 also includes a transistor 350A that has a first end that is coupled to a control terminal of transistor 346A, and a second end that is coupled to receive the far end reset control signal FE_RST_CTRL 344. A control terminal of the transistor 350A is coupled to receive the row select control signal 326A. Far end driver circuitry 314 also includes a transistor 352A coupled between the control terminal of transistor 346A and the reference terminal (e.g., GND). A control terminal of transistor 352A is coupled to receive the reset control signal RST 320A. As such, it is appreciated that transistor 346A is coupled to selectively further drive the reset control signal RST 320A in response to the row select control signal RS 326A and the far end reset control signal FE_RST_CTRL 344.

In particular, transistor 346A functions as a pull down transistor to further drive and reduce the settling time of the reset control signal RST 320A by pulling the reset control signal RST 320A down to the reference voltage, or ground. Transistor 350A functions as a passthrough transistor to pass through the far end reset control signal FE_RST_CTRL 344 in response to the row select control signal RS 326A (for the active row). Transistor 352A functions as a disable transistor in response to the reset control signal RST 320A to disable the pull down transistor 346A from pulling down the reset control signal RST 320A if the reset control signal RST 320A is high.

In the example shown in FIG. 3, the far end driver circuitry 314 that is coupled to the active row also includes a transistor 348A having a first end of coupled to receive the floating diffusion capacitor control signal FDC 322A and a second end coupled to the reference terminal (e.g., GND). Far end driver circuitry 314 also includes a transistor 354A that has a first end that is coupled to a control terminal of transistor 348A, and a second end that is coupled to receive the far end floating diffusion capacitor control signal FE_FDC_CTRL 342. A control terminal of the transistor 354A is coupled to receive the row select control signal RS 326A. Far end driver circuitry 314 also includes a transistor 356A coupled between the control terminal of transistor 348A and the reference terminal (e.g., GND). A control terminal of transistor 356A is coupled to receive the floating diffusion capacitor control signal FDC 322A. As such, it is appreciated that transistor 348A is coupled to selectively further drive the floating diffusion capacitor control signal FDC 322A in response to the row select control signal RS 326A and the far end floating diffusion capacitor control signal FE_FDC_CTRL 342.

In particular, transistor 348A functions as a pull down transistor to further drive and reduce the settling time of the floating diffusion capacitor control signal FDC 322A by pulling the floating diffusion capacitor control signal FDC 322A down to the reference voltage, or ground. Transistor 354A functions as a passthrough transistor to pass through the far end floating diffusion capacitor control signal FE_FDC_CTRL 342 in response to the row select control signal RS 326A (for the active row). Transistor 356A functions as a disable transistor in response to the floating diffusion capacitor control signal FDC 322A to disable the pull down transistor 348A from pulling down the floating diffusion capacitor control signal FDC 322A if the floating diffusion capacitor control signal FDC 322A is high.

For the idle rows, it is appreciated the transistors 346B, 348B, 350B, 352B, 354B, and 356B are similarly coupled to the pixel cells as described above with respect to transistors 346A, 348A, 350A, 352A, 354A, and 356A being coupled to the pixel cells of the active row. However, since the rows are idle, the row select control signal RS 326B remains low, which disables transistors 350B and 354B from passing through the far end control signals FE_FDC_CTRL 342 and FE_RST_CTRL 344 in the idle rows.

Figure 4:
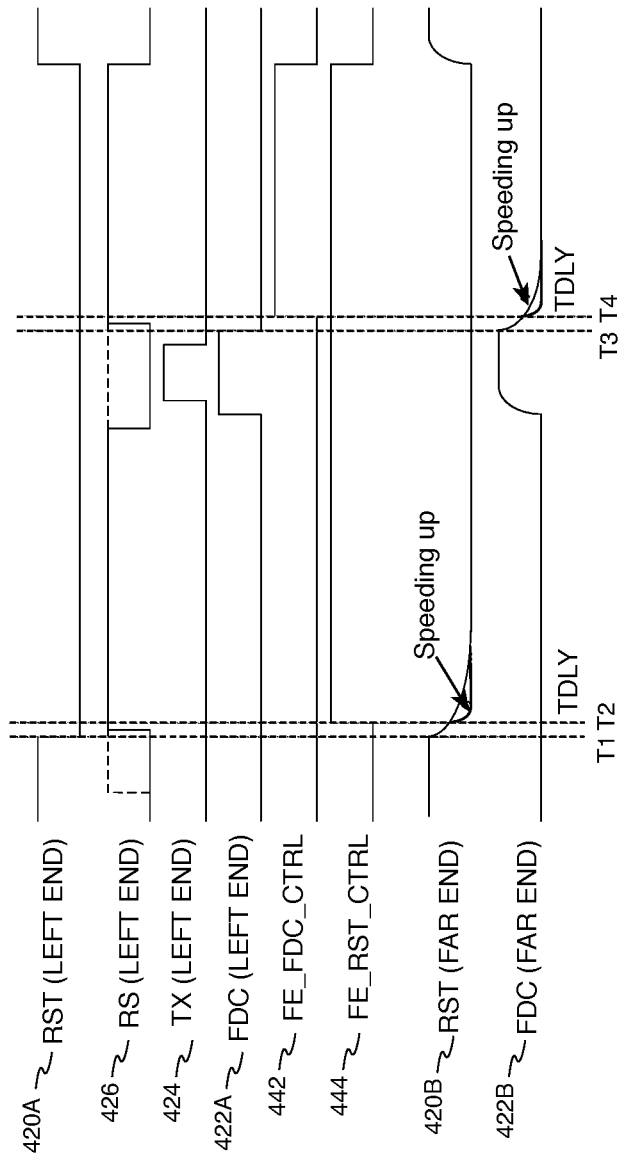
FIG. 4 illustrates an example timing diagram that shows examples of control signals and far end control signals found in an example of far end driver circuitry in accordance with the teachings of the present invention.

To illustrate, FIG. 4 shows an example timing diagram that shows examples of row control signals and far end control signals that are found in an example of far end driver circuitry in accordance with the teachings of the present invention. It is noted that the example row control signals and far end control signals illustrated in of FIG. 4 may be examples of the control signals and far end control signals described above in FIGS. 1-3, and that similarly named and numbered elements referenced below are coupled and function similar to as described above.

As shown, prior to time T1, the reset control signal RST 420A received at the left end of the pixel array (e.g., closest to the control circuitry) transitions sharply from a high value to a low value. The row select control signal RS 426, the transmit control signal TX 424 and the floating diffusion capacitor control signal FDC 422A at the left end of the pixel array are low. However, at the opposite right end or far end of the pixel array, the reset control signal RST 420B begins to transition more slowly from the high value to the low value, due to the RC delay suffered by the reset control signal RST 420 as it propagates across the pixel array from the left end to the far end. However, at time T2, the row select control signal 426 and the far end reset control signal FE_RST_CTRL 444 are activated, which further drives the reset control signal RST 420B by pulling it down to the reference voltage, or ground, thereby "speeding up" the transition and reducing the settling time in accordance with the teachings of the present invention. In one example, the sampling of the reset level output of the pixel cell may occur at this point for correlated double sampling (CDS).

Continuing with the depicted example, at time T3, the floating diffusion capacitor control signal FDC 422A received at the left end of the pixel array (e.g., closest to the control circuitry) transitions sharply from the high value to the low value, but at the opposite right end or far end of the pixel array, the floating diffusion capacitor control signal FDC 422B begins to transition more slowly from the high value to the low value due to the RC delay suffered by the floating diffusion capacitor control signal FDC 422 as it propagates across the pixel array from the left end to the far end. However, at time T4, the row select control signal 426 and the far end floating diffusion capacitor control signal FE_FDC_CTRL 442 are activated, which further drives the floating diffusion capacitor control signal FDC 422B by pulling it down to the reference voltage, or ground, thereby "speeding up" the transition and reducing the settling time in accordance with the teachings of the present invention. In one example, the sampling of the signal level output of the pixel cell may occur at this point for correlated double sampling (CDS).

Figure 5:
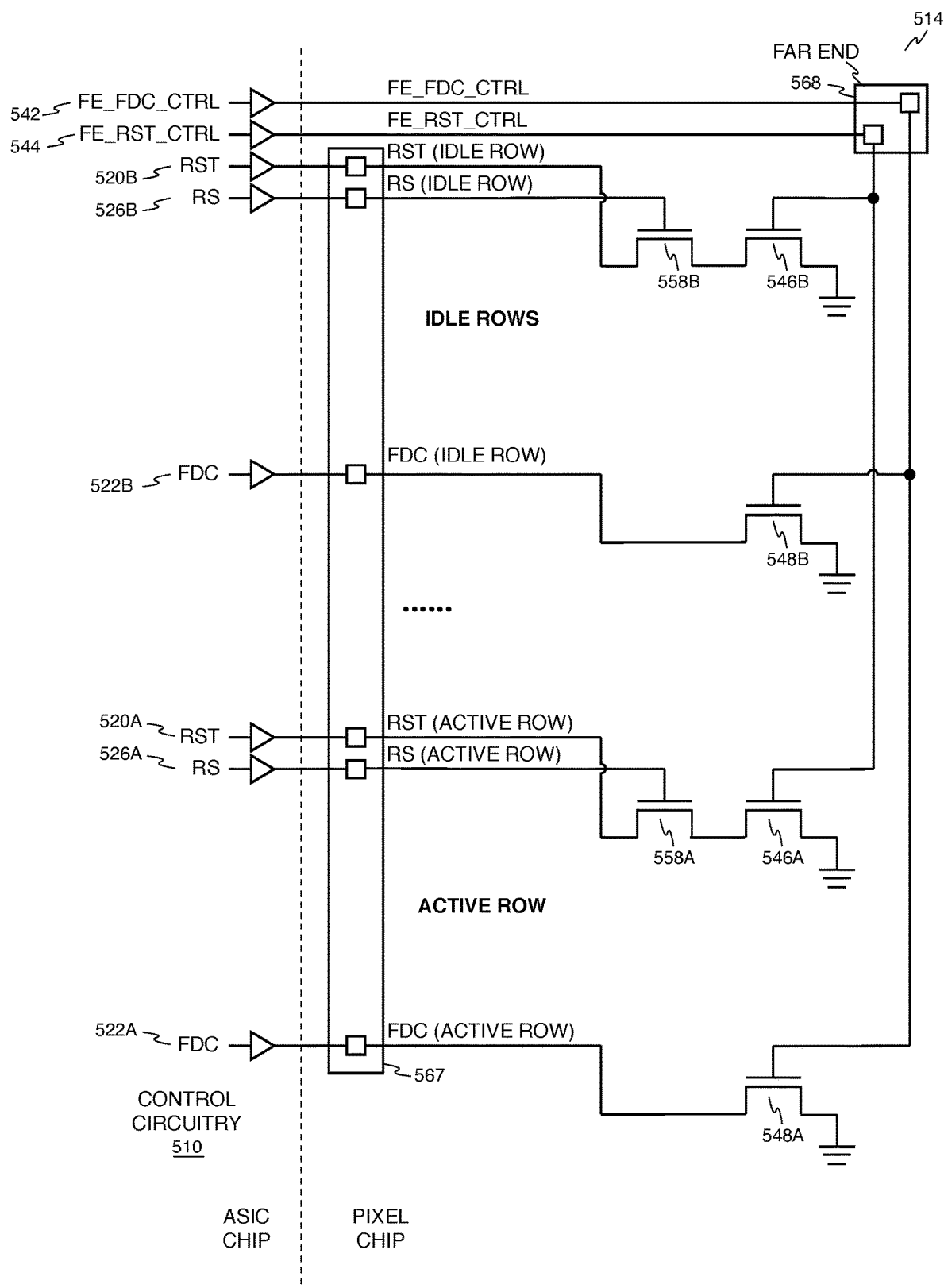
FIG. 5 illustrates another example schematic of far end driver circuitry in accordance with the teachings of the present invention.

FIG. 5 illustrates another example schematic of far end driver circuitry 514 in accordance with the teachings of the present invention. It is noted that the example far end driver circuitry 514 and the control signals illustrated in of FIG. 5 may be other examples of the far end driver circuitry and control signals described above, and that similarly named and numbered elements referenced below are coupled and function similar to as described above. As will be shown in the example depicted in FIG. 5, the far end driver circuitry 514 is also configured to decrease the settling time of the reset control signal RST 520A and the floating diffusion capacitor control signal FDC 522A by pulling down these signals of the active row during transitions from a high level to a low level.

It is also appreciated that the example far end driver circuitry 514 depicted in FIG. 5 shares similarities with the example far end driver circuitry 314 depicted in FIG. 3. For instance, in the example illustrated in FIG. 5, control circuitry 510 is disposed in an ASIC chip and is coupled to generate row control signals and far end control signals. The illustrated example shows row control signals including reset control signals RST 520, floating diffusion capacitor control signals FDC 522, and row select control signals RS 526, which are coupled to be received by hybrid bonds (HB) or through silicon vias (TSVs) on the "left" or near side 567 of the pixel chip closest to the control circuitry 510. The illustrated example also shows far end control signals including far end floating diffusion capacitor control signal (FE_FDC_CTRL) 542 and far end reset control signal (FE_RST_CTRL) 544, which are coupled to be received by hybrid bonds (HB) or through silicon vias (TSVs) on the "right" or far end 568 of the pixel chip opposite to the control circuitry 510.

In the depicted example, the reset control signal RST 520A, floating diffusion capacitor control signal FDC 522A, and row select control signal RS 526A are coupled to drive the pixel cells (e.g., pixel cells 104, 204) of the active row of the pixel array, while the reset control signal RST 520B, floating diffusion capacitor control signal FDC 522B, and row select control signal RS 526B are coupled to drive the pixel cells (e.g., pixel cells 104, 204) of the idle rows of the pixel array. As such, it is appreciated that in one example, the idle row control signal values are AVDD for reset control signal RST 520B, NVDD for row select control signal RS 526B, and AGND for floating diffusion capacitor control signal FDC 522B.

In the depicted example, the far end driver circuitry 514 includes 3 transistors coupled to the far end (e.g., next to the right most column) of each row of the pixel array. As such, it is appreciated that the illustrated transistors of far end driver circuitry 514 are coupled to receive the control signals after they have propagated across all of the pixels (e.g., 104, 204) of each row of the pixel array. In the illustrated example, the 3 transistors for each row are NMOS transistors. In other examples, it is appreciated that the polarities of the 3 transistors and control signals may be reversed depending on the logic of the system. In the example shown in FIG. 5, the far end driver circuitry 514 that is coupled to the active row includes a transistor 546A having a first end coupled to receive the reset control signal RST 520A through a transistor 558A, and a second end coupled to a reference terminal, such as GND. A control terminal of transistor 546A is coupled to receive the far end reset control signal FE_RST_CTRL 544. Transistor 558A has a first end that is coupled to receive the reset control signal RST 520A, and a second end of transistor 558A is coupled to the first end of transistor 546A. A control terminal of transistor 558A is coupled to receive the row select control signal RS 526A. As such, it is appreciated that transistor 546A is selectively coupled to receive the reset control signal RST 520A through transistor 558A in response to the row select row select control signal RS 526, and that transistor 546A is coupled to selectively further drive the reset control signal 520A in response to the row select control signal RS 526A and the far end reset control signal FE_RST_CTRL 544.

In particular, transistor 546A functions as a pull down transistor to further drive and reduce the settling time of the reset control signal RST 520A by pulling the reset control signal RST 520A down to the reference voltage, or ground. Transistor 558A functions as a passthrough transistor to pass through the reset control signal RST 520A in response to the row select control signal RS 526A (for the active row).

In the example shown in FIG. 5, the far end driver circuitry 514 that is coupled to the active row also includes a transistor 548A having a first end of coupled to receive the floating diffusion capacitor control signal FDC 522A and a second end coupled to the reference terminal (e.g., GND). A control terminal of transistor 548A is coupled to receive the far end floating diffusion capacitor control signal FE_FDC_CTRL 542. As such, it is appreciated that transistor 548A is coupled to selectively further drive the floating diffusion capacitor control signal FDC 522A in response to the far end floating diffusion capacitor control signal FE_FDC_CTRL 542.

In particular, transistor 548A functions as a pull down transistor to further drive and reduce the settling time of the floating diffusion capacitor control signal FDC 522A by pulling the floating diffusion capacitor control signal FDC 522A down to the reference voltage, or ground in response to the far end floating diffusion capacitor control signal FE_FDC_CTRL 542.

For the idle rows, it is appreciated the transistors 546B, 548B, and 558B are similarly coupled to the pixel cells as described above with respect to transistors 546A, 548A, and 558A being coupled to the pixel cells of the active row. However, since the rows are idle, the row select control signal RS 526B remains low, which disables transistor 558B from passing through the reset control signal RST 520B in the idle rows. Furthermore, since the default signal for the floating diffusion capacitor control signal FDC 522B is AGND, an additional transistor is not needed for the floating diffusion capacitor control signal FDC 522B in the idle rows.

It is appreciated that the row control signals and far end control signals that are associated with the example far end driver circuitry 514 of FIG. 5 are the same as the examples illustrated in the timing diagram illustrated in FIG. 4.

Figure 6:
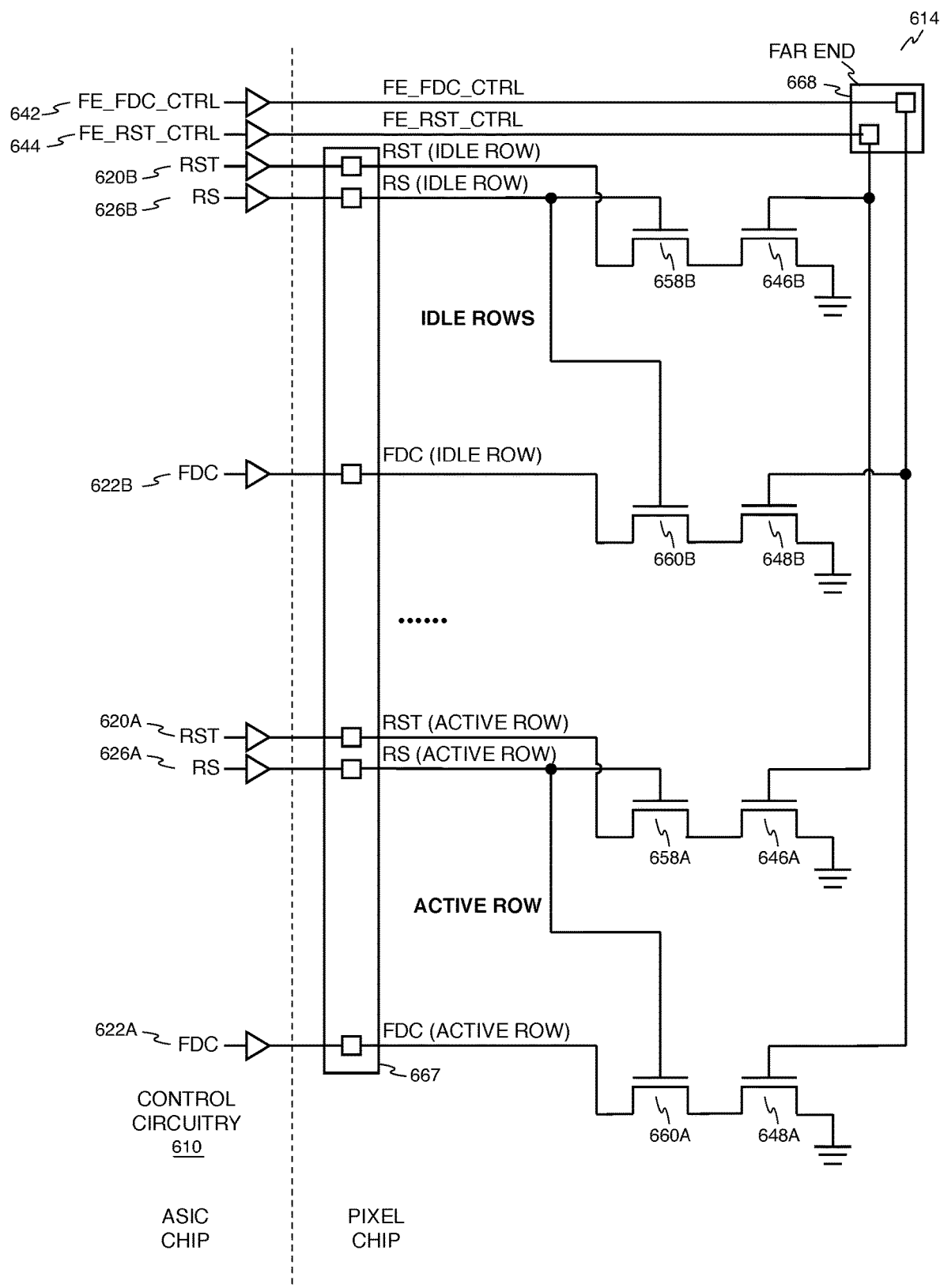
FIG. 6 illustrates yet another example schematic of far end driver circuitry in accordance with the teachings of the present invention.

FIG. 6 illustrates yet another example schematic of far end driver circuitry 614 in accordance with the teachings of the present invention. It is noted that the example far end driver circuitry 614 and the control signals illustrated in of FIG. 6 may be other examples of the far end driver circuitry and control signals described above, and that similarly named and numbered elements referenced below are coupled and function similar to as described above. As will be shown in the example depicted in FIG. 6, the far end driver circuitry 614 is also configured to decrease the settling time of the reset control signal RST 620A and the floating diffusion capacitor control signal FDC 622A by pulling down these signals of the active row during transitions from a high level to a low level.

It is also appreciated that the example far end driver circuitry 614 depicted in FIG. 6 shares similarities with the example far end driver circuitry 514 depicted in FIG. 5. For instance, in the example illustrated in FIG. 6, control circuitry 610 is disposed in an ASIC chip and is coupled to generate row control signals and far end control signals. The illustrated example shows row control signals including reset control signals RST 620, floating diffusion capacitor control signals FDC 622, and row select control signals RS 626, which are coupled to be received by hybrid bonds (HB) or through silicon vias (TSVs) on the "left" or near side 667 of the pixel chip closest to the control circuitry 610. The illustrated example also shows far end control signals including far end floating diffusion capacitor control signal (FE_FDC_CTRL) 642 and far end reset control signal (FE_RST_CTRL) 644, which are coupled to be received by hybrid bonds (HB) or through silicon vias (TSVs) on the "right" or far end 668 of the pixel chip opposite to the control circuitry 610.

In the depicted example, the reset control signal RST 620A, floating diffusion capacitor control signal FDC 622A, and row select control signal RS 626A are coupled to drive the pixel cells (e.g., pixel cells 104, 204) of the active row of the pixel array, while the reset control signal RST 620B, floating diffusion capacitor control signal FDC 622B, and row select control signal RS 626B are coupled to drive the pixel cells (e.g., pixel cells 104, 204) of the idle rows of the pixel array. As such, it is appreciated that in one example, the idle row control signal values are AVDD for reset control signal RST 520B, NVDD for row select control signal RS 626B, and AGND for floating diffusion capacitor control signal FDC 622B.

In the depicted example, the far end driver circuitry 614 includes 4 transistors coupled to the far end (e.g., next to the right most column) of each row of the pixel array. As such, it is appreciated that the illustrated transistors of far end driver circuitry 614 are coupled to receive the control signals after they have propagated across all of the pixels (e.g., 104, 204) of each row of the pixel array. In the illustrated example, the 4 transistors for each row are NMOS transistors. In other examples, it is appreciated that the polarities of the 4 transistors and control signals may be reversed depending on the logic of the system. In the example shown in FIG. 6, the far end driver circuitry 614 that is coupled to the active row includes a transistor 646A having a first end coupled to receive the reset control signal RST 620A through a transistor 658A, and a second end coupled to a reference terminal, such as GND. A control terminal of transistor 646A is coupled to receive the far end reset control signal FE_RST_CTRL 644. Transistor 658A has a first end that is coupled to receive the reset control signal RST 620A, and a second end of transistor 658A is coupled to the first end of transistor 646A. A control terminal of transistor 658A is coupled to receive the row select control signal RS 626A. As such, it is appreciated that transistor 646A is selectively coupled to receive the reset control signal RST 620A through transistor 658A in response to the row select row select control signal RS 626, and that transistor 646A is coupled to selectively further drive the reset control signal RST 620A in response to the row select control signal RS 626A and the far end reset control signal FE_RST_CTRL 644.

In particular, transistor 646A functions as a pull down transistor to further drive and reduce the settling time of the reset control signal RST 620A by pulling the reset control signal RST 620A down to the reference voltage, or ground. Transistor 658A functions as a passthrough transistor to pass through the reset control signal RST 620A in response to the row select control signal RS 626A (for the active row).

In the example shown in FIG. 6, the far end driver circuitry 614 that is coupled to the active row also includes a transistor 648A having a first end of coupled to receive the floating diffusion capacitor control signal FDC 622A through a transistor 660A, and a second end coupled to the reference terminal (e.g., GND). A control terminal of transistor 648A is coupled to receive the far end floating diffusion capacitor control signal FE_FDC_CTRL 542. Transistor 660A has a first end that is coupled to receive the floating diffusion capacitor control signal FDC 622A, and a second end of transistor 660A is coupled to the first end of transistor 648A. A control terminal of transistor 660A is coupled to receive the row select control signal RS 626A. As such, it is appreciated that transistor 648A is coupled to selectively further drive the floating diffusion capacitor control signal FDC 622A in response to the row select control signal RS 626A and the far end floating diffusion capacitor control signal FE_FDC_CTRL 642.

In particular, transistor 648A functions as a pull down transistor to further drive and reduce the settling time of the floating diffusion capacitor control signal FDC 622A by pulling the floating diffusion capacitor control signal FDC 622A down to the reference voltage, or ground in response to the far end floating diffusion capacitor control signal FE_FDC_CTRL 642. Transistor 660A functions as a passthrough transistor to pass through the floating diffusion capacitor control signal FDC 622A in response to the row select control signal RS 626A (for the active row).

For the idle rows, it is appreciated the transistors 646B, 648B, 658B, and 660B are similarly coupled to the pixel cells as described above with respect to transistors 646A, 648A, 658A, and 660A being coupled to the pixel cells of the active row. However, since the rows are idle, the row select control signal RS 626B remains low, which disables transistor 558B from passing through the reset control signal RST 620B and disables transistor 560B from passing through the floating diffusion capacitor control signal FDC 622B in the idle rows.

It is appreciated that the row control signals and far end control signals that are associated with the example far end driver circuitry 614 of FIG. 6 are the same as the examples illustrated in the timing diagram illustrated in FIG. 4.

Figure 7:
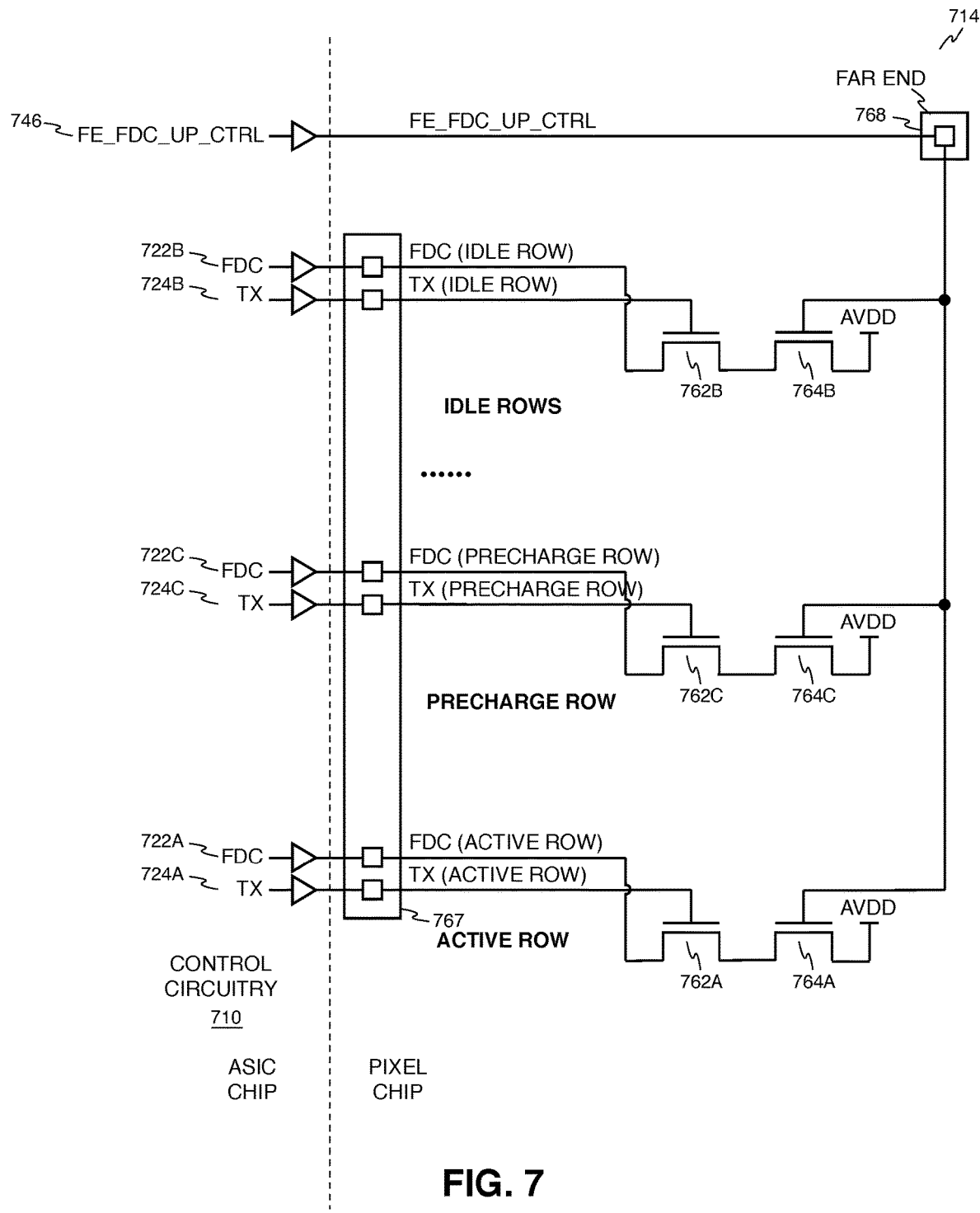
FIG. 7 illustrates still another example schematic of far end driver circuitry in accordance with the teachings of the present invention.

FIG. 7 illustrates still another example schematic of far end driver circuitry 714 in accordance with the teachings of the present invention. It is noted that the example far end driver circuitry 714 and the control signals illustrated in of FIG. 7 may be examples of the far end driver circuitry and control signals described above, and that similarly named and numbered elements referenced below are coupled and function similar to as described above. As will be shown in the example depicted in FIG. 7, the far end driver circuitry 714 is configured to decrease the settling time of the floating diffusion capacitor control signals FDC 722A and FDC 722C by pulling up the floating diffusion capacitor control signals FDC 722A and FDC 722C of the active row and precharge row during transitions from a low level to a high level. In the example, the transfer control signals TX 724A and TX 724C are configured to indicate the active and precharge rows.

In the example illustrated in FIG. 7, control circuitry 710 is disposed in an ASIC chip and is coupled to generate row control signals and far end control signals. The illustrated example shows row control signals including floating diffusion capacitor control signals FDC 722 and transfer control signals TX 724, which are coupled to be received by hybrid bonds (HB) or through silicon vias (TSVs) on the "left" or near side 767 of the pixel chip closest to the control circuitry 710. The illustrated example also shows far end control signals including a far end floating diffusion capacitor up control signal (FE_FDC_UP_CTRL) 746, which is coupled to be received by a hybrid bond (HB) or through silicon via (TSVs) on the "right" or far end 768 of the pixel chip opposite to the control circuitry 710.

In the depicted example, the floating diffusion capacitor control signal FDC 722A and transfer control signal TX 724A are coupled to drive the pixel cells (e.g., pixel cells 104, 204) of the active row of the pixel array, the floating diffusion capacitor control signal FDC 722C and transfer control signal TX 724C are coupled to drive the pixel cells (e.g., pixel cells 104, 204) of the rows of the pixel array that are precharged, and the floating diffusion capacitor control signal FDC 722B and transfer control signal TX 724B are coupled to drive the pixel cells (e.g., pixel cells 104, 204) of the rows of the pixel array that are idle. As such, it is appreciated that in one example, the idle row control signal values are AGND for floating diffusion capacitor control signal FDC 722B and NVDD for transfer control signal TX 724B.

In the depicted example, the far end driver circuitry 714 includes 2 transistors coupled to the far end (e.g., next to the right most column) of each row of the pixel array. As such, it is appreciated that the illustrated transistors of far end driver circuitry 714 are coupled to receive the control signals after they have propagated across all of the pixels (e.g., 104, 204) of each row of the pixel array. In the illustrated example, the 2 transistors for each row are NMOS transistors. In other examples, it is appreciated that the polarities of the 2 transistors and control signals may be reversed depending on the logic of the system. In the example shown in FIG. 7, the far end driver circuitry 714 that is coupled to the active row includes a transistor 762A coupled in series with a transistor 764A between the floating diffusion capacitor control signal FDC 722A and a voltage supply AVDD. A control terminal of transistor 762A is coupled to receive the transfer control signal TX 724A and a control terminal of transistor 764A is coupled to receive far end floating diffusion capacitor up control signal FE_FDC_UP_CTRL 746. As such that the transistor control signal TX 724A and far end floating diffusion capacitor up control signal FE FDC UP CTRL 746 are coupled to selectively further drive the floating diffusion capacitor control signal FDC 722A in response to the transfer control signal TX 724A and the far end floating diffusion capacitor up control signal FE_FDC_UP_CTRL 746.

In particular, transistor 764A functions as a pull up transistor to further drive and reduce the settling time of the floating diffusion capacitor control signal FDC 722A by pulling the floating diffusion capacitor control signal FDC 722A up to the AVDD supply voltage in response to far end floating diffusion capacitor up control signal FE_FDC_UP_CTRL 746. Transistor 762A functions as a passthrough transistor to pass through the floating diffusion capacitor control signal FDC 722A in response to the transfer control signal TX 724A (for the active row).

In the example shown in FIG. 7, the transistors that are coupled to the row that is being precharged are coupled in the same manner as the transistors that are coupled to the active row. In particular, the far end driver circuitry 714 that is coupled to the row that is being precharged includes a transistor 762C coupled in series with a transistor 764C between the floating diffusion capacitor control signal FDC 722C and the voltage supply AVDD. A control terminal of transistor 762C is coupled to receive the transfer control signal TX 724C and a control terminal of transistor 764C is coupled to receive far end floating diffusion capacitor up control signal FE_FDC_UP_CTRL 746. As such, the transistor control signal TX 724C and far end floating diffusion capacitor up control signal FE_FDC_UP_CTRL 746 are coupled to selectively further drive the floating diffusion capacitor control signal FDC 722C in response to the transfer control signal TX 724C and the far end floating diffusion capacitor up control signal FE_FDC_UP_CTRL 746.

For the idle rows, it is appreciated the transistors 762B and 764B are similarly coupled to the pixel cells as described above with respect to transistors 762A and 764A being coupled to the pixel cells of the active row, and/or the transistors 762C and 764C being coupled to the pixel cells of the row that is precharged. However, since the rows are idle, the transmit control signal TX 724B remains low (e.g., NVDD), which disables transistor 762B from passing through the floating diffusion capacitor control signal FDC 722B in the idle rows.

To illustrate, FIG. 8 illustrates another example timing diagram that shows examples of control signals and far end control signals found in another example of far end driver circuitry in accordance with the teachings of the present invention. It is noted that the example row control signals and far end control signals illustrated in of FIG. 8 may be examples of the control signals and far end control signals described above in FIG. 7, and that similarly named and numbered elements referenced below are coupled and function similar to as described above.

As shown in the upper portion of FIG. 8, the timing diagram shows the row control signals and far end control signals for the far end driver circuitry coupled to the rows of the pixel array that are being precharged. As shown prior to time T5, and the floating diffusion capacitor control signal FDC 822A received at the left end of the pixel array (e.g., closest to the control circuitry) is at a low value, the reset control signal RST 820 is pulsed, and the transfer control signal TX 824 transitions to a high value. At time T5, the floating diffusion capacitor control signal FDC 822A transitions sharply from a low value to a high value. However, at the opposite right end or far end of the pixel array, the floating diffusion capacitor control signal FDC 822B begins to transition more slowly from the low value to the high value, due to the RC delay suffered by floating diffusion capacitor control signal FDC 822B as it propagates across the pixel array from the left end to the far end. However, at time T6, the far end floating diffusion capacitor up control signal FE_FDC_UP_CTRL 846 is activated, which further drives the floating diffusion capacitor control signal FDC 822B by pulling it up to the AVDD supply voltage, thereby "speeding up" the transition and reducing the settling time in accordance with the teachings of the present invention. In the example, the far end floating diffusion capacitor up control signal FE_FDC_UP_CTRL 846 is deactivated at time T7, and the floating diffusion capacitor control signal FDC 822A at the left end transitions to a low value, causing the floating diffusion capacitor control signal FDC 822B at the far end to drop as shown.

Continuing with the depicted example, the lower portion of timing diagram illustrated in FIG. 8 shows the row control signals and far end control signals for far end driver circuitry coupled to the active row of the pixel array. As shown prior to time T9, the transfer control signal TX 824 and the floating diffusion capacitor control signal FDC 822A received at the left end of the pixel array (e.g., closest to the control circuitry) are at a low value. At time T9, the floating diffusion capacitor control signal FDC 822A transitions sharply from a low value to a high value. However, at the opposite right end or far end of the pixel array, the floating diffusion capacitor control signal FDC 822B begins to transition more slowly from the low value to the high value, due to the RC delay suffered by floating diffusion capacitor control signal FDC 822B as it propagates across the pixel array from the left end to the far end. However, at time T10, the far end floating diffusion capacitor up control signal FE_FDC_UP_CTRL 846 is activated, which further drives the floating diffusion capacitor control signal FDC 822B by pulling it up to the AVDD supply voltage, thereby "speeding up" the transition and reducing the settling time in accordance with the teachings of the present invention. In the example, the transfer control signal TX 824 and the far end floating diffusion capacitor up control signal FE_FDC_UP_CTRL 846 transition to the low value at time T11, and then the floating diffusion capacitor control signal FDC 822A transitions to a low value at time T12, which causes the floating diffusion capacitor control signal FDC 822B at the far end to drop as shown.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:
1. An image sensor, comprising:
a pixel array including rows and columns of pixels, wherein each row of the pixel array has a first end that is opposite a second end of each row of the pixel array;
control circuitry coupled to the first end of each row of the pixel array to provide control signals to each row of the pixel array from the first end of each row of the pixel array, wherein the control signals provided from the control circuitry to the first end of each row of the pixel array include a reset signal, a floating diffusion capacitor control signal, and a row select signal; and
far end driver circuitry coupled to the second end of each row of the pixel array to selectively further drive from the second end of each row of the pixel array the control signals provided by the control circuitry from the first end of each row of the pixel array, wherein the control circuitry is further coupled to provide far end control signals to the far end driver circuitry, wherein the far end driver circuitry comprises:
a first transistor having a first end and a second end, wherein the first end of the first transistor is coupled to receive the reset signal and wherein the second end of the first transistor is coupled to a reference terminal, wherein the first transistor is coupled to selectively further drive the reset signal in response to the row select signal and a far end reset control signal included in the far end control signals received from the control circuitry; and a second transistor having a first end and a second end, wherein the first end of the second transistor is coupled to receive the floating diffusion capacitor control signal and wherein the second end of the second transistor is coupled to the reference terminal, wherein the second transistor is coupled to selectively further drive the floating diffusion capacitor control signal in response to a far end floating diffusion capacitor control signal included in the far end control signals received from the control circuitry.

2. The image sensor of claim 1, wherein the far end driver circuitry further comprises a third transistor having a first end and a second end, wherein the first end of the third transistor is coupled to a control terminal of the first transistor, wherein the second end of the third transistor is coupled to receive the far end reset control signal, and wherein a control terminal of the third transistor is coupled to receive the row select signal.

3. The image sensor of claim 2, wherein the far end driver circuitry further comprises a fourth transistor coupled between the control terminal of the first transistor and the reference terminal, and wherein a control terminal of the fourth transistor is coupled to receive the reset signal.

4. The image sensor of claim 1, wherein the far end driver circuitry further comprises a fifth transistor having a first end and a second end, wherein the first end of the fifth transistor is coupled to a control terminal of the second transistor, wherein the second end of the fifth transistor is coupled to receive the far end floating diffusion capacitor control signal, and wherein a control terminal of the fifth transistor is coupled to receive the row select signal such that the second transistor is coupled to selectively further drive the floating diffusion capacitor control signal in response to the row select signal and the far end floating diffusion capacitor control signal.

5. The image sensor of claim 4, wherein the far end driver circuitry further comprises a sixth transistor coupled between the control terminal of the second transistor and the reference terminal, and wherein a control terminal of the sixth transistor is coupled to receive the floating diffusion capacitor control signal.

6. The image sensor of claim 1, wherein the far end driver circuitry further comprises a seventh transistor having a first end and a second end, wherein the first end of the seventh transistor is coupled to receive the reset control signal, wherein the second end of the seventh transistor is coupled to the first end of the first transistor, and wherein a control terminal of the seventh transistor is coupled to receive the row select signal such that the first end of the first transistor is selectively coupled to receive the reset signal through the seventh transistor in response to the row select signal.

7. The image sensor of claim 1, wherein the far end driver circuitry further comprises a eighth transistor having a first end and a second end, wherein the first end of the eighth transistor is coupled to receive the floating diffusion capacitor control signal, wherein the second end of the eighth transistor is coupled to the first end of the second transistor, and wherein a control terminal of the eighth transistor is coupled to receive the row select signal, wherein the first end of the second transistor is selectively coupled to receive the floating diffusion capacitor control signal through the eighth transistor in response to the row select signal such that the second transistor is coupled to selectively further drive the floating diffusion capacitor control signal in response to the row select signal and the far end floating diffusion capacitor control signal.

8. An image sensor, comprising:
a pixel array including rows and columns of pixels, wherein each row of the pixel array has a first end that is opposite a second end of each row of the pixel array;
control circuitry coupled to the first end of each row of the pixel array to provide control signals to each row of the pixel array from the first end of each row of the pixel array, wherein the control signals provided from the control circuitry to the first end of each row of the pixel array include a transfer signal and a floating diffusion capacitor control signal; and
far end driver circuitry coupled to the second end of each row of the pixel array to selectively further drive from the second end of each row of the pixel array the control signals provided by the control circuitry from the first end of each row of the pixel array, wherein the control circuitry is further coupled to provide far end control signals to the far end driver circuitry, wherein the far end driver circuitry comprises a ninth transistor coupled in series with a tenth transistor wherein the ninth and tenth transistors are coupled between the floating diffusion capacitor control signal and a voltage supply, wherein a control terminal of the ninth transistor is coupled to receive the transfer signal, and wherein a control terminal of the tenth transistor is coupled to receive a far end floating diffusion up control signal included in the far end control signals received from the control circuitry such that the ninth and tenth transistors are coupled to selectively further drive the floating diffusion capacitor control signal in response to the transfer signal and the far end floating diffusion up control signal.

9. An imaging system, comprising:
a pixel array including a plurality of pixel cells arranged into a plurality of rows and a plurality of columns, wherein each one of the plurality of rows of the pixel array has a first end that is opposite a second end of each one of the plurality of rows of the pixel array;
control circuitry coupled to the first end of each one of the plurality of rows of the pixel array to provide control signals to each one of the plurality of rows of the pixel array from the first end of each one of the plurality of rows of the pixel array, wherein the control signals generated by the control circuitry include for each one of the plurality of rows of the pixel array include a transfer signal, a floating diffusion capacitor control signal, a reset signal, and a row select signal;
far end driver circuitry coupled to the second end of each one of the plurality of rows of the pixel array to selectively further drive from the second end of each one of the plurality of rows of the pixel array the control signals provided by the control circuitry from the first end of each one of the plurality of rows of the pixel array, wherein the control circuitry is further coupled to provide far end control signals to the far end driver circuitry, wherein the far end driver circuitry comprises:
a first transistor having a first end and a second end, wherein the first end of the first transistor is coupled to receive the reset signal and wherein the second end of the first transistor is coupled to a reference terminal, wherein the first transistor is coupled to selectively further drive the reset signal in response to the row select signal and a far end reset control signal included in the far end control signals received from the control circuitry; and a second transistor having a first end and a second end, wherein the first end of the second transistor is coupled to receive the floating diffusion capacitor control signal and wherein the second end of the second transistor is coupled to the reference terminal, wherein the second transistor is coupled to selectively further drive the floating diffusion capacitor control signal in response to a far end floating diffusion capacitor control signal included in the far end control signals received from the control circuitry; and readout circuitry coupled to the pixel array to read out image data from the plurality of pixel cells.

10. The imaging system of claim 9, wherein each one of the plurality of pixel cells comprises:

a photodiode coupled to generate photogenerate image charge in response to incident light;

a transfer transistor coupled to the photodiode;

a floating diffusion capacitor including a first end and a second end, wherein the first end of the floating diffusion capacitor is coupled to the transfer transistor and wherein the second end of the floating diffusion capacitor is coupled to receive the floating diffusion capacitor control signal, wherein the transfer transistor is coupled to transfer the image charge from the photodiode to the floating diffusion capacitor in response to the transfer signal;

a source follower transistor coupled to the floating diffusion capacitor to generate an image data signal from the image charge in the floating diffusion capacitor;

a reset transistor including a first end and a second end, wherein the first end of the reset transistor is coupled to a voltage supply and wherein the second end of the reset transistor is coupled to the floating diffusion capacitor, wherein the reset transistor is coupled to reset the image charge in the floating diffusion capacitor in response to the reset signal; and a row select transistor coupled to the source follower transistor to output the image data signal from the source follower transistor to one of a plurality of bit lines in response to the row select signal.

11. The imaging system of claim 10, wherein the far end driver circuitry further comprises a third transistor having a first end and a second end, wherein the first end of the third transistor is coupled to a control terminal of the first transistor, wherein the second end of the third transistor is coupled to receive the far end reset control signal, and wherein a control terminal of the third transistor is coupled to receive the row select signal.

12. The imaging system of claim 11, wherein the far end driver circuitry further comprises a fourth transistor coupled between the control terminal of the first transistor and the reference terminal, and wherein a control terminal of the fourth transistor is coupled to receive the reset signal.

13. The imaging system of claim 10, wherein the far end driver circuitry further comprises a fifth transistor having a first end and a second end, wherein the first end of the fifth transistor is coupled to a control terminal of the second transistor, wherein the second end of the fifth transistor is coupled to receive the far end floating diffusion capacitor control signal, and wherein a control terminal of the fifth transistor is coupled to receive the row select signal such that the second transistor is coupled to selectively further drive the floating diffusion capacitor control signal in response to the row select signal and the far end floating diffusion capacitor control signal.

14. The imaging system of claim 13, wherein the far end driver circuitry further comprises a sixth transistor coupled between the control terminal of the second transistor and the reference terminal, and wherein a control terminal of the sixth transistor is coupled to receive the floating diffusion capacitor control signal.

15. The imaging system of claim 10, wherein the far end driver circuitry further comprises a seventh transistor having a first end and a second end, wherein the first end of the seventh transistor is coupled to receive the reset control signal, wherein the second end of the seventh transistor is coupled to the first end of the first transistor, and wherein a control terminal of the seventh transistor is coupled to receive the row select signal such that the first end of the first transistor is selectively coupled to receive the reset signal through the seventh transistor in response to the row select signal.

16. The imaging system of claim 10, wherein the far end driver circuitry further comprises a eighth transistor having a first end and a second end, wherein the first end of the eighth transistor is coupled to receive the floating diffusion capacitor control signal, wherein the second end of the eighth transistor is coupled to the first end of the second transistor, wherein a control terminal of the eighth transistor is coupled to receive the row select signal, wherein the first end of the second transistor is selectively coupled to receive the floating diffusion capacitor control signal through the eighth transistor in response to the row select signal such that the second transistor is coupled to selectively further drive the floating diffusion capacitor control signal in response to the row select signal and the far end floating diffusion capacitor control signal.

17. An imaging system, comprising:

a pixel array including a plurality of pixel cells arranged into a plurality of rows and a plurality of columns, wherein each one of the plurality of rows of the pixel array has a first end that is opposite a second end of each one of the plurality of rows of the pixel array;

control circuitry coupled to the first end of each one of the plurality of rows of the pixel array to provide control signals to each one of the plurality of rows of the pixel array from the first end of each one of the plurality of rows of the pixel array, wherein the control signals generated by the control circuitry include for each one of the plurality of rows of the pixel array include a transfer signal, a floating diffusion capacitor control signal, a reset signal, and a row select signal;

far end driver circuitry coupled to the second end of each one of the plurality of rows of the pixel array to selectively further drive from the second end of each one of the plurality of rows of the pixel array the control signals provided by the control circuitry from the first end of each one of the plurality of rows of the pixel array, wherein the control circuitry is further coupled to provide far end control signals to the far end driver circuitry, wherein the far end driver circuitry comprises a ninth transistor coupled in series with a tenth transistor, wherein the ninth and tenth transistors are coupled between the floating diffusion capacitor control signal and a voltage supply, wherein a control terminal of the ninth transistor is coupled to receive the transfer signal, and wherein a control terminal of the tenth transistor is coupled to a far end floating diffusion up control signal included in the far end control signals received from the control circuitry such that the ninth and tenth transistors are coupled to selectively further drive the floating diffusion capacitor control signal in response to the transfer signal and the far end floating diffusion up control signal; and readout circuitry coupled to the pixel array to read out image data from the plurality of pixel cells.

\* \* \* \* \*